United States Patent
Watanabe et al.

(10) Patent No.: US 9,611,388 B2
(45) Date of Patent: Apr. 4, 2017

(54) THERMOPLASTIC RESIN COMPOSITION COMPRISING ACRYLIC-MODIFIED SILICONE RESIN

(71) Applicant: Nissin Chemical Industry Co., Ltd., Echizen-shi, Fukui-ken (JP)

(72) Inventors: Kentaro Watanabe, Echizen (JP); Yukihiro Masuda, Echizen (JP)

(73) Assignee: NISSIN CHEMICAL INDUSTRY CO., LTD., Echizen-Shi (JP)

( * ) Notice: Subject to any disclaimer, the term of this patent is extended or adjusted under 35 U.S.C. 154(b) by 8 days.

(21) Appl. No.: 14/527,959

(22) Filed: Oct. 30, 2014

(65) Prior Publication Data

US 2015/0119526 A1    Apr. 30, 2015

(30) Foreign Application Priority Data

Oct. 31, 2013 (JP) ................. 2013-226291

(51) Int. Cl.

| | |
|---|---|
| *C08L 55/02* | (2006.01) |
| *C08L 77/02* | (2006.01) |
| *C08L 77/06* | (2006.01) |
| *C08L 79/04* | (2006.01) |
| *C08L 79/08* | (2006.01) |
| *C08F 283/12* | (2006.01) |
| *C08F 290/14* | (2006.01) |
| *C08G 77/442* | (2006.01) |
| *C08G 73/10* | (2006.01) |
| *C08G 73/14* | (2006.01) |
| *C08G 73/18* | (2006.01) |

(52) U.S. Cl.
CPC .......... *C08L 77/06* (2013.01); *C08F 283/124* (2013.01); *C08F 290/148* (2013.01); *C08L 55/02* (2013.01); *C08L 77/02* (2013.01); *C08L 79/04* (2013.01); *C08L 79/08* (2013.01); *C08G 73/1046* (2013.01); *C08G 73/14* (2013.01); *C08G 73/18* (2013.01); *C08G 77/442* (2013.01)

(58) Field of Classification Search
CPC .......... C08L 55/02; C08L 77/00; C08L 77/02; C08L 77/06; C08L 79/04; C08L 79/08; C08L 2666/24; C08L 51/085; C08F 283/124; C08F 290/148

See application file for complete search history.

(56) References Cited

U.S. PATENT DOCUMENTS

| | | | | |
|---|---|---|---|---|
| 4,994,522 A | * | 2/1991 | Sasaki | C08F 285/00 525/479 |
| 5,773,520 A | * | 6/1998 | Bertelo | C08F 265/06 525/307 |
| 6,509,403 B1 | * | 1/2003 | Weber | C08K 3/16 524/413 |
| 2004/0152808 A1 | | 8/2004 | Tezuka et al. | |
| 2005/0143520 A1 | * | 6/2005 | Saegusa | C08F 283/12 525/100 |

FOREIGN PATENT DOCUMENTS

| | | |
|---|---|---|
| DE | 10 2008 001 825 A1 | 11/2009 |
| DE | 102010062886 A1 * | 6/2011 |
| JP | 2001-261919 A | 9/2001 |
| JP | 2002-363403 A | 12/2002 |
| JP | 2003-82227 A | 3/2003 |
| JP | 2004-107526 A | 4/2004 |

OTHER PUBLICATIONS

Extended European Search Report issued Mar. 31, 2015, in European Patent Application No. 14190005.0.

* cited by examiner

*Primary Examiner* — Irina S Zemel
*Assistant Examiner* — Jeffrey Lenihan
(74) *Attorney, Agent, or Firm* — Birch, Stewart, Kolasch & Birch, LLP

(57) ABSTRACT

A thermoplastic resin composition having advantages including tensile strength, sliding properties and heat resistance is obtained by blending (I) a thermoplastic resin containing N, S or Cl with (II) an acrylic-modified polyorganosiloxane obtained from emulsion/graft polymerization of a mixture comprising (i) a polyorganosiloxane, (ii) a (meth)acrylate monomer, and (iii) a copolymerizable monomer.

15 Claims, No Drawings

THERMOPLASTIC RESIN COMPOSITION COMPRISING ACRYLIC-MODIFIED SILICONE RESIN

CROSS-REFERENCE TO RELATED APPLICATION

This non-provisional application claims priority under 35 U.S.C. §119(a) on Patent Application No. 2013-226291 filed in Japan on Oct. 31, 2013, the entire contents of which are hereby incorporated by reference.

TECHNICAL FIELD

This invention relates to a thermoplastic resin composition having improved friction resistance while maintaining the performance of prior art thermoplastic resins. More particularly, it relates to a thermoplastic resin composition comprising an acrylic-modified silicone resin, and a molded part thereof.

BACKGROUND ART

For the purposes of reducing the weight and cost of many industrial parts, great efforts have hitherto been made to replace metal parts by plastic parts. Even in the fields of automotive parts and sliding members where impact resistance and durability are crucial, many plastic parts have been devised and used in practice. Known as the resin suited in such applications are polycarbonate resins, ABS resins, AS resins and polyamide resins, which are generally referred to as engineering plastics.

However, polycarbonate and ABS resins are short of sliding properties when used alone. Since they often fail to comply with the field requiring abrasion resistance, a further improvement in performance is needed. Also, polyamide and ABS resins have good sliding properties as such, but a further improvement in performance is needed in many fields.

To solve these problems, for example, JP-A 2002-363403 attempts to improve sliding properties by combining a polyamide resin with a modified polyolefin resin and a fluoroplastic or silicone lubricant. While it is essential to use a large amount of the modified olefin resin in combination with the polyamide resin, the modified olefin resin is less compatible, and interfacial separation is likely to occur. The fluoroplastic or silicone lubricant to be blended is also less compatible. Since the composition is liable to interfacial separation and difficult to mold, there is left room for further improvement.

JP-A 2003-082227 and JP-A 2004-107526 disclose polyamide compositions containing silicone. JP-A 2001-261919 discloses a sliding modifier which is obtained by graft polymerizing a vinyl polymer to a composite rubber composed of polyorganosiloxane rubber component and poly(alkyl(meth)acrylate) component to form a composite rubber-based graft copolymer and blending the composite rubber-based graft copolymer with a silicone oil or olefin oil. This sliding modifier is added to a thermoplastic resin or thermoplastic elastomer. However, since the silicone oil or olefin oil is blended, the composition is less compatible, liable to interfacial separation and difficult to mold.

CITATION LIST

Patent Document 1: JP-A 2002-363403
Patent Document 2: JP-A 2003-082227
Patent Document 3: JP-A 2004-107526
Patent Document 4: JP-A 2001-261919

DISCLOSURE OF INVENTION

An object of the invention is to provide a thermoplastic resin composition having improved compatibility over the use of silicone oil, minimized interfacial separation, and improved tribology such as abrasion resistance.

The inventors have found that a thermoplastic resin composition having surface activity while maintaining strength, heat resistance and appearance is obtained by blending a certain amount of an acrylic-modified silicone copolymer resin with a thermoplastic resin.

In one aspect, the invention provides a thermoplastic resin composition comprising (I) 100 parts by weight of a thermoplastic resin containing at least one element selected from nitrogen, sulfur and chlorine, and (II) 0.5 to 20 parts by weight of an acrylic-modified polyorganosiloxane obtained from emulsion/graft polymerization of a mixture comprising (i) a polyorganosiloxane, (ii) a (meth)acrylate monomer, and (iii) a copolymerizable monomer having a functional group, the polyorganosiloxane (i) having the general formula (1):

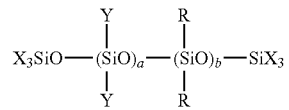

(1)

wherein R is each independently a substituted or unsubstituted $C_1$-$C_{20}$ alkyl or $C_6$-$C_{20}$ aryl group, X is each independently a substituted or unsubstituted $C_1$-$C_{20}$ alkyl, $C_6$-$C_{20}$ aryl, $C_1$-$C_{20}$ alkoxy or hydroxyl group, Y is each independently a group: X or —[O—Si(X)$_2$]$_c$—X, at least two of X and Y are hydroxyl, a is a number of 0 to 1,000, b is a positive number of 100 to 10,000, and c is a positive number of 1 to 1,000.

In a preferred embodiment, the acrylic-modified polyorganosiloxane (II) is obtained from a mixture comprising 100 parts by weight of the polyorganosiloxane (i), 10 to 100 parts by weight of the (meth)acrylate monomer (ii), and 0.01 to 20 parts by weight of the copolymerizable monomer (iii).

In a preferred embodiment, the (meth)acrylate monomer (ii) is selected such that a polymer thereof may have a glass transition temperature of at least 40° C.

In a preferred embodiment, the thermoplastic resin (I) is selected from the group consisting of a polyamide resin, polyetherimide resin, polyamide-imide resin, polybenzimidazole resin, ABS resin, AS resin, polysulfone resin, polyphenylene sulfide resin, polyether sulfone resin, polyarylene sulfide resin, vinyl chloride resin, and chlorinated vinyl chloride resin. Typically, the thermoplastic resin (I) is a polyamide resin.

In a preferred embodiment, the copolymerizable monomer (iii) has a carboxyl, amide, hydroxyl or vinyl group as the functional group.

In another aspect, the invention provides a method for preparing a thermoplastic resin composition, comprising the steps of:

polymerizing a cyclic organosiloxane to form (i) a polyorganosiloxane having formula (1) as set forth above, emulsion/graft polymerizing a mixture of (i) polyorganosiloxane, (ii) a (meth)acrylate monomer and (iii) a copolymerizable monomer having a functional group to form (II) an acrylic-modified polyorganosiloxane, and blending (II) the acrylic-modified polyorganosiloxane with (I) a thermoplastic resin containing at least one element selected from nitrogen, sulfur and chlorine.

In the step of polymerizing a cyclic organosiloxane, a silane coupling agent is preferably added to the cyclic organosiloxane.

A molded part of the thermoplastic resin composition defined above is also provided. It finds use as a fastener, fan, vehicle gear, intake manifold, radiator tank, canister, engine cover, bearing retainer, or fender mirror.

ADVANTAGEOUS EFFECTS OF INVENTION

The thermoplastic resin composition of the invention is endowed with long-term tribological properties and substantially free of fissure or degradation while maintaining strength. With respect to miscibility and moldability in particular, it is superior to the prior art compositions. Molded parts of the composition are useful as fasteners, fans, vehicle gears, intake manifolds, radiator tanks, canisters, engine covers, bearing retainers, and fender mirrors.

DESCRIPTION OF PREFERRED EMBODIMENTS

As used herein, the terminology "(meth)acrylate monomers" refers collectively to acrylate monomers and methacrylate monomers. The notation ($C_n$-$C_m$) means a group containing from n to m carbon atoms per group.

Briefly stated, the invention provides a thermoplastic resin composition comprising (I) a thermoplastic resin containing nitrogen, sulfur or chlorine, and (II) an acrylic-modified polyorganosiloxane obtained from emulsion/graft polymerization of a mixture comprising (i) a polyorganosiloxane having the general formula (1) defined herein, (ii) a (meth)acrylate monomer, and (iii) a copolymerizable monomer having a functional group.

Component (A) is a thermoplastic resin containing at least one element selected from nitrogen, sulfur and chlorine. Suitable thermoplastic resins containing nitrogen include polyamide resins, polyetherimide resins, polyamide-imide resins, polybenzimidazole resins, ABS resins and AS resins. Suitable thermoplastic resins containing sulfur include polysulfone resins, polyphenylene sulfide resins, polyether sulfone resins, and polyarylene sulfide resins. Suitable thermoplastic resins containing chlorine include vinyl chloride resins and chlorinated vinyl chloride resins.

Of the foregoing thermoplastic resins, polyamide resins are preferably selected because their mechanical and tribological properties are outstandingly improved by blending the acrylic-modified polyorganosiloxane (II) therewith. Exemplary of the polyamide resin are nylon 6, nylon 11, nylon 12, nylon 66, nylon 610, nylon 6T, nylon 6I, nylon 9T, nylon M5T, etc.

Component (II) is an acrylic-modified polyorganosiloxane obtained from emulsion/graft polymerization of a mixture comprising (i) a polyorganosiloxane having the general formula (1) defined herein, (ii) a (meth)acrylate monomer, and (iii) a copolymerizable monomer having a functional group.

According to the invention, 100 parts by weight of the thermoplastic resin (I) is blended with 0.5 to 20 parts by weight, preferably 2 to 10 parts by weight of the acrylic-modified polyorganosiloxane (II).

The acrylic-modified polyorganosiloxane (II) is preferably obtained from a mixture comprising 100 parts by weight of polyorganosiloxane (i), 10 to 100 parts by weight of (meth)acrylate monomer (ii), and 0.01 to 20 parts by weight of the copolymerizable monomer (iii), more preferably a mixture comprising 100 parts by weight of polyorganosiloxane (i), 40 to 100 parts by weight of (meth)acrylate monomer (ii), and 0.01 to 5 parts by weight of the copolymerizable monomer (iii).

The polyorganosiloxane (i) has the general formula (1).

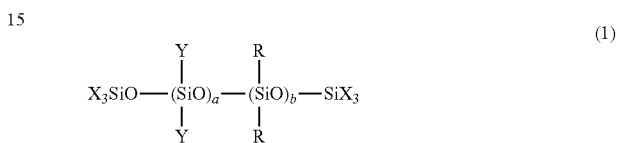

Herein R is each independently a substituted or unsubstituted $C_1$-$C_{20}$ alkyl or $C_6$-$C_{20}$ aryl group, X is each independently a substituted or unsubstituted $C_1$-$C_{20}$ alkyl, $C_6$-$C_{20}$ aryl, $C_1$-$C_{20}$ alkoxy or hydroxyl group, Y is each independently a group: X or —[O—Si(X)$_2$]$_c$—X, at least two of X and Y are hydroxyl, a is a number of 0 to 1,000, b is a positive number of 100 to 10,000, and c is a positive number of 1 to 1,000.

Specifically, R which may be the same or different is selected from substituted or unsubstituted $C_1$-$C_{20}$ alkyl groups and $C_6$-$C_{20}$ aryl groups, for example, methyl, ethyl, propyl, butyl, pentyl, hexyl, heptyl, octyl, nonyl, decyl, dodecyl, tetradecyl, hexadecyl, octadecyl, cyclopentyl, cyclohexyl, cycloheptyl, phenyl, tolyl, and naphthyl. Substituted alkyl groups include the foregoing alkyl groups substituted with a halogen atom, acryloxy, methacryloxy, carboxy, alkoxy, alkenyloxy, amino, alkyl, or alkoxy- or (meth)acryloxy-substituted amino radical. Most often, R is methyl.

X which may be the same or different is selected from substituted or unsubstituted $C_1$-$C_{20}$ alkyl groups, $C_6$-$C_{20}$ aryl groups, $C_1$-$C_{20}$ alkoxy groups and hydroxyl groups. Exemplary groups (excluding hydroxyl) include methyl, ethyl, propyl, butyl, pentyl, hexyl, heptyl, octyl, nonyl, decyl, dodecyl, tetradecyl, hexadecyl, octadecyl, cyclopentyl, cyclohexyl, cycloheptyl, phenyl, tolyl, naphthyl, methoxy, ethoxy, propoxy, butoxy, hexyloxy, heptyloxy, octyloxy, decyloxy, and tetradecyloxy. Substituted alkyl groups are as exemplified above.

Y which may be the same or different is X or —[O—Si(X)$_2$]$_c$—X. At least two of X and Y groups are hydroxyl. That is, from the standpoint of crosslinking, the compound should contain at least 2 hydroxyl groups, preferably 2 to 4 hydroxyl groups per molecule, specifically at both ends.

The subscript "a" is a number of 0 to 1,000, preferably 0 to 200. If "a" is greater than 1,000, film strength may become insufficient. The subscript "b" is a positive number of 100 to 10,000, preferably 1,000 to 5,000. If "b" is smaller than 100, film flexibility may become poor. If "b" is greater than 10,000, film tear strength may become low. The subscript "c" is a positive number of 1 to 1,000, preferably 1 to 200.

Component (i), polyorganosiloxane may be obtained by ring-opening polymerization of a cyclic organosiloxane. Examples of the starting cyclic organosiloxane include hexamethylcyclotrisiloxane (D3), octamethylcyclotetrasiloxane (D4), decamethylcyclopentasiloxane (D5), dodecamethylcyclohexasiloxane (D6), 1,1-diethylhexamethylcyclotetrasiloxane, phenylheptamethylcyclotetrasiloxane, 1,1-diphenylhexamethylcyclotetrasiloxane, 1,3,5,7-tetravinyltetramethylcyclotetrasiloxane, 1,3,5,7-tetramethylcyclotetrasiloxane, 1,3,5,7-tetracyclohexyltetramethylcyclotetrasiloxane, tris(3,3,3-trifluoropropyl)trimethylcyclotrisiloxane, 1,3,5,7-tetra(3-methacryloxypropyl)tetramethylcyclotetrasiloxane, 1,3,5,7-tetra(3-acryloxypropyl)tetramethylcyclotetrasiloxane, 1,3,5,7-tetra(3-carboxypropyl)tetramethylcyclotetrasiloxane, 1,3,5,7-tetra(3-vinyloxypropyl)tetramethylcyclotetrasiloxane, 1,3,5,7-tetra(p-vinylphenyl)tetramethylcyclotetrasiloxane, 1,3,5,7-tetra[3-(p-vinylphenyl)propyl]tetramethylcyclotetrasiloxane, 1,3,5,7-tetra(N-acryloyl-N-methyl-3-aminopropyl)tetramethylcyclotetrasiloxane, and 1,3,5,7-tetra(N,N-bis(lauroyl)-3-aminopropyl)tetramethylcyclotetrasiloxane.

It is acceptable to further copolymerize the cyclic organosiloxane with a silane coupling agent having the general formula (2):

$$R^3{}_{(4-d-e)}R^5{}_eSi(OR^4)_d \quad (2)$$

wherein $R^3$ is a monovalent organic group having a polymerizable double bond, typically an acryloxy or methacryloxy-substituted $C_1$-$C_6$ alkyl group, $R^4$ is $C_1$-$C_4$ alkyl, $R^5$ is $C_1$-$C_4$ alkyl, d is an integer of 1 to 3, e is an integer of 0 to 2, e+d=1 to 3. Copolymerization of the silane coupling agent has an effect of helping the organosiloxane to bond with the monomer (ii) or (iii).

Examples of the silane coupling agent include 3-methacryloxypropylmethyldimethoxysilane, 3-methacryloxypropyltrimethoxysilane, 3-methacryloxypropylmethyldiethoxysilane, 3-methacryloxypropyltriethoxysilane, and 3-acryloxypropyltrimethoxysilane. The silane coupling agent is preferably used in an amount of 0.01 to 20 parts by weight, more preferably 0.01 to 5 parts by weight relative to 100 parts by weight of the cyclic organosiloxane.

A catalyst may be used during polymerization of the cyclic organosiloxane. The polymerization catalyst is preferably selected from strong acids, for example, hydrochloric acid, sulfuric acid, dodecylbenzenesulfonic acid, citric acid, lactic acid, and ascorbic acid. Inter alia, dodecylbenzenesulfonic acid having emulsifying ability is preferred.

Also a surfactant may be used during polymerization of the cyclic organosiloxane. Suitable anionic surfactants include sodium laurylsulfate, sodium laureth sulfate, N-acylamino acid salts, N-acyltaurine salts, fatty acid soaps, and alkylphosphates. Among others, those surfactants which are soluble in water and free of polyethylene oxide chains are preferred. More preferred are N-acylamino acid salts, N-acyltaurine salts, fatty acid soaps, and alkylphosphates. Most preferred are sodium lauroyl methyl taurate and sodium myristoyl methyl taurate.

For the polymerization of the cyclic organosiloxane, preferred conditions include a temperature of 50 to 75° C. and a time of at least 10 hours, especially at least 15 hours. At the end of polymerization, the reaction product is preferably aged at 5 to 30° C. for at least 10 hours.

Component (ii) is a (meth)acrylate monomer, that is, an acrylate or methacrylate monomer free of a functional group such as a hydroxyl, amide or carboxyl group. Preferred are $C_1$-$C_{10}$ alkyl(meth)acrylates. More preferably the (meth)acrylate monomer is selected such that a polymer thereof may have a glass transition temperature (Tg) of at least 40° C., especially at least 60° C. Suitable monomers include butyl acrylate, methyl methacrylate, isopropyl methacrylate, ethyl methacrylate, and cyclohexyl methacrylate. The upper limit of Tg is preferably up to 200° C., more preferably up to 150° C. It is noted that Tg is measured according to JIS K7121.

Component (iii) is a functional group-containing monomer copolymerizable with component (ii), typically a unsaturated bond-bearing monomer having a carboxyl, amide, hydroxyl, vinyl, allyl or similar group. Suitable monomers include methacrylic acid, acrylic acid, acrylamide, allyl methacrylate, vinyl methacrylate, 2-hydroxyethyl methacrylate, and 2-hydroxypropyl methacrylate. Copolymerization of such a monomer renders the polymer more compatible.

Component (II) is obtained in emulsion form from emulsion/graft polymerization of a mixture comprising (i) polyorganosiloxane, (ii) (meth)acrylate monomer, and (iii) copolymerizable monomer having a functional group, as defined above.

A radical initiator may be used for the emulsion/graft polymerization. Suitable initiators include persulfates such as potassium persulfate and ammonium persulfate, aqueous hydrogen persulfate, t-butyl hydroperoxide, and hydrogen peroxide. If necessary, a reducing agent such as acidic sodium sulfite, Rongalit, L-ascorbic acid, tartaric acid, sucroses, or amines may be used in combination therewith to provide a redox catalyst.

With only the surfactant already contained in the polyorganosiloxane emulsion, graft polymerization is possible. For stability improving purpose, an anionic surfactant may be added, for example, sodium laurylsulfate, sodium laureth sulfate, N-acylamino acid salt, N-acyltaurine salt, fatty acid soap or alkylphosphate. Also a nonionic emulsifier may be added such as polyoxyethylene lauryl ether or polyoxylene tridecyl ether.

For graft polymerization of components (ii) and (iii), a temperature of 25 to 55° C., especially 25 to 40° C. is preferred. A polymerization time of 2 to 8 hours, especially 3 to 6 hours is preferred.

Further a chain transfer agent may be added for adjusting the molecular weight and graft rate of the graft polymer.

The acrylic-modified polyorganosiloxane (II) thus obtained is a polymer having randomly grafted components (ii) and (iii). The acrylic-modified polyorganosiloxane should preferably have a solids content of 35 to 50% by weight, a viscosity at 25° C. of up to 500 mPa·s, more preferably 50 to 500 mPa·s, and an average particle size of 0.1 to 0.5 μm (i.e., 100 to 500 nm). Notably, the viscosity is measured by a rotational viscometer.

The acrylic-modified polyorganosiloxane may be granulated into a powder form by a suitable method. Spray drying, airborne drying and other granulating methods are exemplary. A spray dryer is preferred for productivity. Hot drying is preferred for granulation, and drying at 80 to 150° C. is more preferred. The resulting powder preferably has as small an average particle size as possible, specifically up to 50 μm, more preferably 1 to 30 μm. The particle size of the emulsion and the powder may be measured as cumulative weight average diameter $D_{50}$ by a laser diffractometry particle size analyzer.

The acrylic-modified polyorganosiloxane (II) is blended with the thermoplastic resin (I) to formulate a thermoplastic resin composition. Additives may be added to the thermoplastic resin composition insofar as its performance is not impaired. Suitable additives include an antioxidant, coloring agent, UV absorber, photo-stabilizer, antistatic agent, plasticizer, flame retardant, and another resin.

The thermoplastic resin composition may be prepared by combining components (I) and (II), specifically melt mixing. For melt mixing, a single-screw extruder, twin-screw extruder, kneader, Banbury mixer or the like may be used. Although the mixing conditions are not particularly limited, the composition is preferably mixed at a temperature of 120 to 400° C., more preferably 200 to 320° C. The mixed composition is pelletized in a desired shape such as cylinder, prism, sphere and the like. In general, a molded product is obtained by molding the pellet. As a molding method, the conventional method of thermoplastic resins such as extrusion molding, injection molding, blow molding, calender molding, and compression molding is employed to obtain a molded product having a desired shape.

The thermoplastic resin composition finds a wide variety of applications as injection molded parts and films. Molded parts include daily items such as fasteners and fans, vehicle parts including engine-related parts such as gears, intake manifolds, radiator tanks, canisters, engine covers, and bearing retainers, and exterior parts such as fender mirrors. The composition is most advantageous for use as gears and bearing retainers which are desired to improve wear resistance by enhancing sliding properties.

EXAMPLE

Examples of the invention are given below by way of illustration and not by way of limitation. In Examples, all parts and % are by weight.
[Emulsion Viscosity]
The viscosity of an emulsion was measured at 25° C. by a Brookfield viscometer using No. 2 rotor at 6 rpm.
[Particle Size]
The particle size of an emulsion or powder is measured as cumulative weight average diameter $D_{50}$ by a laser diffractometry particle size analyzer.

Preparation Example 1

A 2-L polyethylene beaker was charged with a solution of 499.6 g of octamethylcyclotetrasiloxane, 0.4 g of 3-methacryloxypropyldimethoxysilane, and 5 g of sodium lauryl sulfate in 45 g of deionized water and a solution of 5 g of dodecylbenzenesulfonic acid in 45 g of deionized water, which were uniformly emulsified by a homo-mixer. The emulsion was diluted by slowly adding 400 g of water, and passed twice through a high-pressure homogenizer under a pressure of 300 kgf/cm$^2$, yielding a uniform white emulsion. The emulsion was transferred to a 2-L glass flask equipped with a stirrer, thermometer, and reflux condenser, where polymerization reaction was conducted at 50° C. for 24 hours. The reaction solution was aged at 10° C. for 24 hours, whereupon it was neutralized to pH 6.2 with 12 g of 10% aqueous sodium carbonate solution. The emulsion had a nonvolatile content of 45.4% when dried at 105° C. for 3 hours. The organopolysiloxane in the emulsion was a non-flowing soft gel. In this way, there was obtained an emulsion containing ~45% of component (i).

To the emulsion, methyl methacrylate, butyl acrylate and acrylamide in a weight ratio of 89/1/10 were graft polymerized through redox reaction at room temperature for 4 hours in the presence of peroxide and vitamin C, yielding a ~45% acrylic silicone resin emulsion (acrylic-modified polyorganosiloxane). In the acrylic-modified silicone resin, the acrylic monomers were randomly graft polymerized. The design is such that 22.5 parts of (meth)acrylate (ii) and 2.5 parts of copolymerizable monomer (iii) are present per 100 parts of polyorganosiloxane (i). A polymer of (meth)acrylate as component (ii) has a Tg of 102° C. The emulsion had a viscosity of 100 mPa·s at 25° C. and an average particle size of 220 nm. The emulsion was spray dried at 100° C., obtaining a powder having an average particle size of 30 μm.

Preparation Example 2

A 2-L polyethylene beaker was charged with a solution of 499.6 g of octamethylcyclotetrasiloxane, 0.4 g of 3-methacryloxypropyldimethoxysilane, and 5 g of sodium lauryl sulfate in 45 g of deionized water and a solution of 5 g of dodecylbenzenesulfonic acid in 45 g of deionized water, which were uniformly emulsified by a homo-mixer. The emulsion was diluted by slowly adding 400 g of water, and passed twice through a high-pressure homogenizer under a pressure of 300 kgf/cm$^2$, yielding a uniform white emulsion. The emulsion was transferred to a 2-L glass flask equipped with a stirrer, thermometer, and reflux condenser, where polymerization reaction was conducted at 50° C. for 24 hours. The reaction solution was aged at 10° C. for 24 hours, whereupon it was neutralized to pH 6.2 with 12 g of 10% aqueous sodium carbonate solution. The emulsion had a nonvolatile content of 45.4% when dried at 105° C. for 3 hours. The organopolysiloxane in the emulsion was a non-flowing soft gel. In this way, there was obtained an emulsion containing ~45% of component (i).

To the emulsion, methyl methacrylate, butyl acrylate and acrylic acid in a weight ratio of 89/1/10 were graft polymerized through redox reaction for 4 hours in the presence of peroxide and vitamin C, yielding a ~45% acrylic silicone resin emulsion. The design is such that 22.5 parts of (meth)acrylate (ii) and 2.5 parts of copolymerizable monomer (iii) are present per 100 parts of polyorganosiloxane (i). A polymer of (meth)acrylate as component (ii) has the same Tg as in Preparation Example 1. The emulsion had a viscosity of 150 mPa·s at 25° C. and an average particle size of 210 nm. The emulsion was spray dried, obtaining a powder having an average particle size of 30 μm.

Preparation Example 3

A 2-L polyethylene beaker was charged with a solution of 498 g of octamethylcyclotetrasiloxane, 0.4 g of 3-methacryloxypropyldimethoxysilane, and 5 g of sodium lauryl sulfate in 45 g of deionized water and a solution of 5 g of dodecylbenzenesulfonic acid in 45 g of deionized water, which were uniformly emulsified by a homo-mixer. The emulsion was diluted by slowly adding 400 g of water, and passed twice through a high-pressure homogenizer under a pressure of 300 kgf/cm$^2$, yielding a uniform white emulsion. The emulsion was transferred to a 2-L glass flask equipped with a stirrer, thermometer, and reflux condenser, where polymerization reaction was conducted at 50° C. for 24 hours. The reaction solution was aged at 10° C. for 24 hours, whereupon it was neutralized to pH 6.2 with 12 g of 10% aqueous sodium carbonate solution. The emulsion had a nonvolatile content of 45.4% when dried at 105° C. for 3 hours. The organopolysiloxane in the emulsion was a non-flowing soft gel. In this way, there was obtained an emulsion containing ~45% of component (i).

To the emulsion, methyl methacrylate and 2-hydroxypropyl methacrylate in a weight ratio of 98/2 were graft polymerized through redox reaction for 4 hours in the presence of peroxide and vitamin C, yielding a ~45% acrylic silicone resin emulsion. The design is such that 42 parts of (meth)acrylate (ii) and 0.9 part of copolymerizable monomer (iii) are present per 100 parts of polyorganosiloxane (i). A polymer of (meth)acrylate as component (ii) has a Tg of 103° C. The emulsion had a viscosity of 130 mPa·s at 25° C. and an average particle size of 210 nm. The emulsion was spray dried, obtaining a powder having an average particle size of 30 μm.

Example 1

Using a twin-screw extruder, 100 parts of Amilan CM1017 (polyamide resin by Toray Industries, Inc.) and 5 parts of the acrylic-modified polyorganosiloxane of Preparation Example 1 were milled and extruded at 230° C., thereby obtaining pellets. The pellets were fed to a 80-ton injection molding machine (Nissei Plastic Industrial Co., Ltd.) set at a cylinder temperature of 280° C. and a mold temperature of 120° C. Parts of 80 mm×80 mm x 3 mm were molded on the machine and examined by the following physical and tribological tests.
[Tensile Strength]
Measured according to ASTM D638. A tensile strength of at least 70 MPa is preferable.

The surface melting and appearance are evaluated according to the following scale of four ratings.

| Rating | Surface melting | Surface state |
| --- | --- | --- |
| Excellent (⊚) | no | no changes |
| Good (○) | slight | substantially no changes |
| Poor (X) | melted | noticeable changes |
| Very poor (XX) | considerably melted | severe changes |

[Molding Shrinkage]
A molding shrinkage (SL) is determined by measuring a size and computing according to the following equation.

$$SL = (L_0 - L)/L_0 \times 100\%$$

wherein L0 is the size of a mold cavity and L is the size of a molded part after holding at room temperature for 24 hours. While a SL value closer to 0% is better, a SL value of up to 1.5% is acceptable.

Examples 2 to 6 and Comparative Examples 1 to 3

Components (I) and (II) were blended as shown in Table 1. The resulting compositions were evaluated as in Example 1, with the results shown in Table 1.

TABLE 1

| | Example | | | | | | Comparative Example | | |
| --- | --- | --- | --- | --- | --- | --- | --- | --- | --- |
| | 1 | 2 | 3 | 4 | 5 | 6 | 1 | 2 | 3 |
| Amilan CM1017 | 100 | 100 | 100 | | 100 | | 100 | | 100 |
| Maranyl nylon 66 A125J | | | | 100 | | | | 100 | |
| Kralastic GA101 | | | | | | 100 | | | |
| KF-96-10000cs | | | | | | | 5 | 5 | |
| Preparation Example 1 | 5 | 20 | | 5 | | 5 | | | 35 |
| Preparation Example 2 | | | 5 | | | | | | |
| Preparation Example 3 | | | | | 5 | | | | |
| Tensile strength (MPa) | 75 | 73 | 74 | 83 | 73 | 56 | 65 | 60 | 45 |
| Coefficient of surface dynamic friction | 0.03 | 0.02 | 0.03 | 0.03 | 0.03 | 0.02 | 0.08 | 0.08 | 0.15 |
| Abrasion resistance (mg/1,000 cycles) | 0.5-0.7 | 0.3-0.5 | 0.5-0.7 | 0.7-0.8 | 0.7-0.8 | 1-2 | 1-2 | 4-5 | 4-5 |
| Molding shrinkage (%) | 1 | 1 | 0.8 | 1.2 | 1 | 0.5 | 1.5 | 2 | 1.4 |
| Heat resistance | ⊚ | ⊚ | ⊚ | ⊚ | ⊚ | ⊚ | X | ○ | ○ |

Amilan CM1017: nylon 6 by Toray Industries, Inc.
Maranyl nylon 66 A125J: nylon 66 by Unitika Ltd.
Kralastic GA101: ABS resin by Nippon A&L Inc.
KF-96-10000cs: dimethylsilicone oil by Shin-Etsu Chemical Co., Ltd.

[Surface Friction Coefficient]
Measured by the Taber abrasion test of JIS K7204. A coefficient of friction of up to 0.04 is desirable.
[Abrasion Resistance]
Measured according to JIS K7204.
Test sample: plate of 3 mm thick
Contact body material: Delrin® 100 by E.I. duPont
Contact body shape: ½ inch molded ball
Total load: 500 gf
Sliding motion: 1,000 cycles of 40 mm sliding strokes
Speed: 30 cm/min
Measuring conditions: room temperature (25° C.), RH 65%
A coefficient of friction is an average of friction coefficient values taken on every 100 cycles during 1,000 cycles of sliding motion. A coefficient of friction of up to 0.8 mg is preferable.
[Heat Resistance]
Heat resistance was evaluated by resting a test sample of 3 mm thick on a hot plate at 280° C., placing a load of 630 gf thereon, taking out the sample after 1 minute, and observing the contact surface whether or not it was melted.

As seen from Table 1, the resin compositions within the scope of the invention are superior in tensile strength and friction resistance. It is believed that an improvement in abrasion resistance is attributed to the prevention of interfacial separation due to improved compatibility of polyorganosiloxane with thermoplastic resin and improved processability thereof.

Japanese Patent Application No. 2013-226291 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:
1. A thermoplastic resin composition comprising:
(I) 100 parts by weight of a thermoplastic resin containing at least one element selected from nitrogen, sulfur and chlorine, wherein the thermoplastic resin (I) is selected from the group consisting of a polyamide resin, polyetherimide resin, polyamide-imide resin, polybenzimidazole resin, AS resin, polyphenylene sulfide resin, polyarylene sulfide resin, vinyl chloride resin, and chlorinated vinyl chloride resin, and (II) 0.5 to 20 parts by weight of an acrylic-modified polyorganosiloxane obtained from emulsion/graft polymerization of a mixture comprising (i) a polyorganosiloxane, (ii) a (meth)acrylate monomer, (iii) a copolymerizable monomer having a functional group, wherein the polyorganosiloxane (i) has the general formula (1):

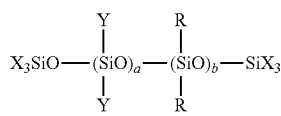
(1)

wherein R is each independently a substituted or unsubstituted $C_1$-$C_{20}$ alkyl or $C_6$-$C_{20}$ aryl group, X is each independently a substituted or unsubstituted $C_1$-$C_{20}$ alkyl, $C_6$-$C_{20}$ aryl, $C_1$-$C_{20}$ alkoxy or hydroxyl group, Y is each independently a group: X or —[O—Si(X)$_2$]$_c$—X, at least two of X and Y are hydroxyl, a is a number of 0 to 1,000, b is a positive number of 100 to 10,000, and c is a positive number of 1 to 1,000, and wherein the copolymerizable monomer (iii) has a carboxyl, amide or hydroxyl group as the functional group.

2. The composition of claim 1, wherein the acrylic-modified polyorganosiloxane (II) is obtained from a mixture comprising 100 parts by weight of the polyorganosiloxane (i), 10 to 100 parts by weight of the (meth)acrylate monomer (ii), and 0.01 to 20 parts by weight of the copolymerizable monomer (iii).

3. The composition of claim 1, wherein the (meth)acrylate monomer (ii) is selected such that a polymer thereof has a glass transition temperature of at least 40° C.

4. The composition of claim 1, wherein the thermoplastic resin (I) is a polyamide resin.

5. The composition of claim 1, wherein the thermoplastic resin (I) is vinyl chloride resin or chlorinated vinyl chloride resin.

6. The composition of claim 1, wherein the thermoplastic resin (I) is selected from the group consisting of a polyetherimide resin, polyamide-imide resin, polybenzimidazole resin, AS resin, polyphenylene sulfide resin, polyarylene sulfide resin, vinyl chloride resin, and chlorinated vinyl chloride resin.

7. A molded part comprising the thermoplastic resin composition of claim 1, wherein the molded part is selected from the group consisting of fastener, fan, vehicle gear, intake manifold, radiator tank, canister, engine cover, bearing retainer, and fender mirror.

8. The molded part of claim 7, wherein the molded part is selected from vehicle gear and bearing retainers.

9. A method for preparing a thermoplastic resin composition, comprising the steps of:

(a) polymerizing a cyclic organosiloxane in the presence of a silane coupling agent to form (i) a polyorganosiloxane having general formula (1),

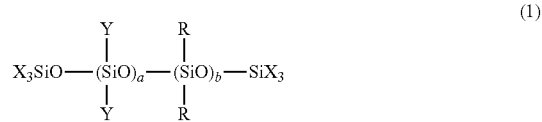
(1)

wherein R is each independently a substituted or unsubstituted $C_1$-$C_{20}$ alkyl or $C_6$-$C_{20}$ aryl group, X is each independently a substituted or unsubstituted $C_1$-$C_{20}$ alkyl, $C_6$-$C_{20}$ aryl, $C_1$-$C_{20}$ alkoxy or hydroxyl group, Y is each independently a group: X or —[O—Si(X)$_2$]$_{hd\ c}$—X, at least two of X and Y are hydroxyl, a is a number of 0 to 1,000, b is a positive number of 100 to 10,000, and c is a positive number of 1 to 1,000, (b) emulsion/graft polymerizing a mixture of (i) the polyorganosiloxane, (ii) a (meth)acrylate monomer and (iii) a copolymerizable monomer having a functional group to form (II) an acrylic-modified polyorganosiloxane, wherein the copolymerizable monomer (iii) has a carboxyl, amide or hydroxyl group as the functional group., and (c) blending (II) the acrylic-modified polyorganosiloxane with (I) a thermoplastic resin containing at least one element selected from nitrogen, sulfur and chlorine wherein the thermoplastic resin (I) is selected from the group consisting of a polyamide resin, polyetherimide resin, polyamide-imide resin, polybenzimidazole resin, AS resin, polyphenylene sulfide resin, polyarylene sulfide resin, vinyl chloride resin, and chlorinated vinyl chloride resin. selected from vehicle gear and bearing retainers.

10. The method of claim 9, wherein the silane coupling agent has the general formula (2):

(2)

wherein $R^3$ is a monovalent organic group having a polymerizable double bond, $R^4$ is $C_1$-$C_4$ alkyl, $R^5$ is $C_1$-$C_4$ alkyl, d is an integer of 1 to 3, e is an integer of 0 to 2, and e+d=1 to 3.

11. The method of claim 10, wherein $R^3$ of the silane coupling agent is acryloxy or methacryloxy-substituted $C_1$-$C_6$ alkyl group.

12. The method of claim 10, wherein the thermoplastic resin (I) is vinyl chloride resin or chlorinated vinyl chloride resin.

13. The method of claim 10, wherein the thermoplastic resin (I) is selected from the group consisting of a polyetherimide resin, polyamide-imide resin, polybenzimidazole resin, AS resin, polyphenylene sulfide resin, polyarylene sulfide resin, vinyl chloride resin, and chlorinated vinyl chloride resin.

14. The method of claim 9, wherein the thermoplastic resin (I) is vinyl chloride resin or chlorinated vinyl chloride resin.

15. The method of claim 9, wherein the thermoplastic resin (I) is selected from the group consisting of a polyetherimide resin, polyamide-imide resin, polybenzimidazole resin, AS resin, polyphenylene sulfide resin, polyarylene sulfide resin, vinyl chloride resin, and chlorinated vinyl chloride resin.

* * * * *